(12) United States Patent
Lvov

(10) Patent No.: US 11,897,192 B2
(45) Date of Patent: Feb. 13, 2024

(54) METHOD FOR MANUFACTURING A PART FROM POWDER

(71) Applicant: Denis Ernestovich Lvov, Saint-Petersburg (RU)

(72) Inventor: Denis Ernestovich Lvov, Saint-Petersburg (RU)

(*) Notice: Subject to any disclaimer, the term of this patent is extended or adjusted under 35 U.S.C. 154(b) by 335 days.

(21) Appl. No.: 17/272,729

(22) PCT Filed: Sep. 2, 2019

(86) PCT No.: PCT/RU2019/000609
§ 371 (c)(1),
(2) Date: Mar. 2, 2021

(87) PCT Pub. No.: WO2020/050747
PCT Pub. Date: Mar. 12, 2020

(65) Prior Publication Data
US 2021/0362403 A1 Nov. 25, 2021

(30) Foreign Application Priority Data

Sep. 6, 2018 (RU) .......................... RU2018132075

(51) Int. Cl.
*B29C 64/153* (2017.01)
*B33Y 10/00* (2015.01)
(Continued)

(52) U.S. Cl.
CPC .......... *B29C 64/153* (2017.08); *B29C 64/264* (2017.08); *B33Y 10/00* (2014.12); *H05B 6/80* (2013.01); *H05B 2206/046* (2013.01)

(58) Field of Classification Search
CPC ... B29C 64/141; B29C 64/153; B29C 64/264; B29C 64/268; B29C 64/273;
(Continued)

(56) References Cited

U.S. PATENT DOCUMENTS

2015/0054204 A1* 2/2015 Tseliakhovich ....... B29C 64/264
  425/162
2018/0272613 A1* 9/2018 Cieszynski ............. B22F 12/13

FOREIGN PATENT DOCUMENTS

CN 107810102 A * 3/2018 ............ B22F 3/1055
EP 3258219 A1 * 12/2017 ............. B22F 10/00

* cited by examiner

*Primary Examiner* — Joseph S Del Sole
*Assistant Examiner* — Jamel M Nelson
(74) *Attorney, Agent, or Firm* — Aird & McBurney LP

(57) ABSTRACT

The method for manufacturing a part from powder relates to the electrical engineering field. In particular, to the processing of materials and the production of flat or three-dimensional products from both metal and plastic, ceramics, metal-plastic and metal-ceramics using microwave heating. The purpose is a method that uses the means of heating due to microwave radiation to sinter or melt the materials, both ceramic and plastic materials and metal powders. The method includes the creation of a microwave field within the operating chamber with a microwave radiation power of 100 W to 150 MW and a frequency of 1 GHz to 10 THz, depending on the physical properties of the powder, the dimensions, degree of accuracy and complexity of the geometric shapes of the sintered (melted) part, the development in the created microwave field of zones with increased intensity of microwave radiation, in which the powder heating zones are developed corresponding to the zones with increased intensity of microwave radiation, which shape follows the point or flat cutting (section) or the spatial pattern of the part, with the intensity of microwave radiation being sufficient for the thermal energy release to heat the powder to its sintering/melting temperature, taking into account the initial temperature of the powder, and where the powder is sintered or melted to produce the part by means (Continued)

of the released thermal energy in the heating zones of the powder.

2 Claims, 4 Drawing Sheets

(51) Int. Cl.
*B29C 64/264* (2017.01)
*H05B 6/80* (2006.01)

(58) Field of Classification Search
CPC ... B29C 64/277; B29C 64/282; B29C 64/286; B29C 64/291; B29C 64/295; B33Y 10/00; B33Y 30/00; H05B 6/80; B28B 1/001
See application file for complete search history.

METHOD FOR MANUFACTURING A PART FROM POWDER

FIELD OF THE INVENTION

The method for manufacturing a part from powder relates to the electrical engineering field. In particular, to the processing of materials and the production of flat or three-dimensional products from both metal and plastic, ceramics, metal-plastic and metal-ceramics using microwave heating.

The purpose is a method that uses the means of heating due to microwave radiation to sinter or melt the materials, both ceramic and plastic materials and metal powders.

PRIOR ART

The prior act discloses the invention "Method for Manufacturing the Dentist Instrument Grinding Wheel", patent RU2 005 436, published on 15 Jan. 1994, IPC A61C 3/02, where the abrasive mixture is simultaneously affected by ultrasound with an electromagnetic field and then the effect is stopped. The method is used to apply a thin layer of the abrasive to the instrument. It is used in metal processing. However, since a problem is not set to receive a complex coating, the entire coating is heated as a whole, ensuring its strong adhesion to the instrument.

There is a known invention "Method for Compacting Ceramic Materials under the Influence of Centimeter Electromagnetic Waves and Vessel for this Method", patent RU2 313 508 published on 27 Dec. 2006, pr.c. 19 Jul. 2002 (pp. 1-6, 11-21) DE 10232818.8; 20 Nov. 2002 (pp. 7-10) EP 02025674.9, IPC C04B 35/64; H05B 6/6, where the sintered material is exposed to microwave radiation, emitting the electromagnetic waves in the multimode generation mode with the wave length in vacuum from 5 to 20 cm at the electromagnetic radiation power up to 1 kW. It allows reducing the energy consumed for its implementation and increasing the uniformity of heating of the sintered material. However, the problem is not set to create new products and only thermal compaction of porous products is carried out. The method is time-consuming, since it requires the vessel vacuuming. In addition, it can be used only for products with certain porosity. It requires a material that has a low thermal conductivity and at the same time a high transmission ratio of centimeter waves. It does not allow setting the desired geometric compaction shape and, therefore, cannot "bake" products of the required shape from the powder. The method uses a wave length range of only 5 to 20 cm and has large material limitations.

There is a known invention "Method of Sintering a Large Ceramic Product with the Use of Microwave Radiation Heating", patent RU2 315 443 published on 20 Jan. 2008, IPC H05B 6/64; H01B 3/12, when the microwave radiation is formed as a wave beam and the microwave radiation with the regulated power is used at the frequency of at least 2.45 GHz. This relates to the sintering method by microwave heating. It allows improving the uniformity of the temperature distribution inside the large sintered product in the course of sintering. However, this method can be used only for large products, and the microwave heating power in this method is controlled by changing the thermal conductivity of materials, i. e. artificially reducing the heating temperature of particles for the uniform temperature distribution. In contrast to the proposed method, the control of the radiation power does not allow setting the desired geometric shape of sintering by heating at points corresponding to the geometry of the part.

There is a known invention "Method for Manufacturing Three-Dimensional Products from Powders and a Device for its Implementation", patent RU2 539 135, published on 10 Sep. 2013, IPC B22F 3/105, where there is an operating chamber, a operating hopper with a piston that moves the powder layer and the product in the vertical direction, a hopper feeder, a carriage for powder filling and laying. This allows scanning the given area of the powder layer with a small focus spot, which provides for the layer-by-layer sintering of the product with the determined configuration. However, the actual sintering process is carried out by laser radiation, which leads to high power consumption and difficulty in ensuring the temperature conditions of the surface layer, as well as the impossibility to sinter powders with a high light reflection ratio. In this method, a combination of a microwave radiation source with a laser radiation scanning area is provided only for preheating of the powder. Microwave radiation affects only the surfaces irradiated by the laser. At the same time, the combination of these two sources is used only for preheating the total powder mass by microwave radiation, since the microwave radiation heating is not focused on the required points, so the actual direct sintering is carried out by a laser. Thus, this method allows maintaining the temperature conditions only for the surface layer. As a result, the small size of the irradiation spot in the product and the correspondingly high temperature gradients in the sintering/melting area lead to the development of pores and cracks. As a result, the powder setting uniformity over the entire volume of the filling is violated. In addition, in this method it is impossible to heat powders with high reflectivity, since the laser beam will be reflected from them.

The invention "A Device for Ceramic Product Sintering by Microwave Radiation Heating", patent RU2 334 376, published on 20 Sep. 2008 Bulletin No. 26, IPC H05B 6/64, is the closest one to the proposed technical solution and is actually used as a prototype. This device has a sintering chamber connected to the microwave radiation source. In contrast to the proposed technical solution, in this invention, a pre-fabricated workpiece (with the required shape) is placed in the chamber and then sintered or melted. Therefore, in this invention, a technical problem is set to improve the temperature uniformity in the volume of the sintered product by local overheating of a narrow area along the edge (perimeter) of the plate due to the diffraction effects of electromagnetic waves in the microwave range. However, this diffraction effect is used to combat with the heat losses from the surface of the sintered product. The non-uniform temperature distribution in the product is not used as a factor for development of the desired part configuration, but it is combated. In the proposed method, the sintering process is significantly complicated as a result of the need for complex calculation and adjustment of the ratios between the power released during the absorption of microwave radiation in the workpiece of the sintered product and the power released in the absorbing casing.

DISCLOSURE OF THE INVENTION

The inventive problem of the proposed technical solution is to create a method for manufacturing a part from powder using microwave radiation.

Complex parts, both flat and three-dimensional are required. For this purpose, 3D printers are currently used, for example, by wire welding in places, where an electric current is applied between the surface and the feeding head. However, this method can only be used to produce metal products, the accuracy is low, maximum 2-3 wire diameters, and, in addition, the filler material (wire metal) is transported through an electric arc making it spray out.

In other known methods, the material is applied to the part in the form of a powder layer by layer, followed by its heating at specified points. Sintering is carried out, for example, by selective laser sintering (SLS). In this case, the powder can be heated to its sintering, but not melting. As a result, the produced part is inaccurate, loose (2-3 powder particle sizes) and weak. If the powder is heated by selective laser melting (SLM) to the melting state, the part will be stronger, but in the course of melting a micro-bath is formed from the molten material, which leads to high uncompensated thermal stresses, shape distortions and development of a "coat" of stuck powder in this place of the part, which also reduces the accuracy of the part. In addition, when heated by laser the heating power is transmitted with light (the wave length in the range of the IR spectrum). This process has very low efficiency and productivity (due to the small diameter of the focusing spot and limited maximum power density due to the optical breakdown conditions), and the heating efficiency will greatly depend on reflectivity, shape, and even orientation of the powder particles. If the surface of the particle reflects the laser beam well, then it will not be heated. This is especially true for metal powders.

The EBM (selective electron beam melting) method is also used, in which the powder particles are heated by the impact of the electron beam. This method allows producing a dense and strong part, which strength is similar to the casting strength. However, the problems of sticking of the adjacent particles in the form of a "coat" and very low productivity (it is impossible to make the beam diameter larger) remain. At the same time, the reflectivity and orientation of the powder particles are not important, because the power is transmitted through the kinetic impact of some particles (e.g. electrons) with the other particles (powder). This method can be implemented using an electron beam gun, in which a stream of electrons is formed. However, since the free path of electrons in the air does not exceed 2.5 mm, the entire operating chamber, in which the part is produced, shall be vacuumized Therefore, this method is very expensive and complicated for the industrial production. In addition, in the course of melting at high rates, when the electron beam is decelerated, part of their energy, apart from heating, is transferred to X-radiation, which is harmful to the personnel. Thus, there is a need to provide biological protection against radiation in addition the chamber sealing. That is why, despite high energy efficiency of this method, it is impossible to produce a strong, accurate, complex part from powder with simultaneous formation of the part geometry.

A method shall be developed to manufacture a part from powder with good strength properties and accuracy for the part configurations of any degree of complexity. Furthermore, as part of the sintering or melting method it is required to ensure the powder particles heating at the determined points providing for the method insensitivity to the reflectivity of the material, shape and orientation of the particles.

It is necessary to provide the possibility to quickly change the size of the heating zone to increase the productivity and the sintering/melting rate in the heating zone, which will provide for the volumetric heating in this zone without heat convection to the neighboring zones, leading to the "coat" development.

It is required to provide the sintering or melting of the particles of choice, depending on the power adjustment that ensures the required strength of the complex flat or three-dimensional part. In addition, it is necessary to ensure the possibility of using the proposed method due to its low cost and low energy consumption not only in the industrial production, but also at home, since the method shall be safe, simple and cheap to use. Moreover, it is desirable to provide the possibility of melting/sintering any powders, for example, metal, plastic, ceramics, etc., on the same installation.

The proposed method solves the problems set for its implementation. Thus, the proposed method achieves the technical result by manufacturing a strong, accurate, complex part from powder consisting of both the dielectric material and conductive materials, with high energy efficiency of this method.

This technical result is achieved as follows. The method for manufacturing a part from powder includes placement of the powder with a particle size of maximum 1 mm in an operating chamber with an air, gas, liquid or solid transit medium with a microwave field. This method is characterized in and its novelty is that the powder particle size does not exceed 1 mm. The powder can be placed in the air, gas, liquid or solid medium. It is important that either said medium or the powder itself has polar molecules. The powder is exposed to zones with increased intensity of microwave radiation. The novelty of the method is to create a microwave field within the operating chamber with a microwave radiation power of 100 W to 150 MW and a frequency of 1 GHz to 10 THz, depending on the physical properties of the powder, the dimensions, degree of accuracy and complexity of the geometric shapes of the sintered/melted part. At that, zones with increased intensity of microwave radiation are established in the created microwave field, where the powder heating zones corresponding to the zones with increased intensity of microwave radiation are developed, which shape follows a point or flat cut (section) or spatial image of said part. The intensity of microwave radiation in these zones is sufficient to release thermal energy to heat the powder to its sintering/melting temperature, taking into account the initial temperature of the powder. The powder is sintered or melted and the part is produced due to the released thermal energy in the powder heating zones.

It is important that heating in the established powder heating zones is carried out quickly enough so that heat convection to the neighboring zones does not have time to produce a significant impact. For this purpose the microwave radiation in the heating zone is regulated (generated).

EMBODIMENTS OF THE INVENTION

In a particular case, as an implementation Example of the proposed generalized method, a method for manufacturing a part from powder can be used, in which an increased intensity of microwave radiation sufficient to heat the powder to the sintering/melting temperature is achieved by releasing thermal energy as a result of microwave radiation absorption in the zones with increased intensity. The location of these zones corresponds to the holographic three-dimensional image of the part and is set (determined) by the interference matrix. The interference matrix is a plate irradiated by microwave radiation with a programmed holographic interference image of the produced part and is placed in the operating chamber relative to the microwave radiation source so that the microwave radiation falls on the interference matrix and illuminates it or passes through it.

In the second special case of the method of manufacturing a part from powder, thermal energy is generated by provoking a microwave breakdown in the determined zone being the powder heating zone. In this case heating takes place when the microwave field intensity in this (breakdown) zones exceeds the critical value. The increased intensity is caused by applying either a virtual resonator obtained by focusing an ionizing ultraviolet (UV) light/laser stream using a lens or a solid resonator of a special shape to this zone. Any object of an elongated shape, or an object in the form of a split ring can serve as a resonator. The size of the resonator is chosen depending on the wave length. The wave length is selected depending on the degree of detail (print resolution) of the sintered/melted part. At that, at least one resonator is moved in space above the respective powder layer, creating (organizing) the powder heating zones, where the powder is sintered/melted at points (zones) corresponding to the geometric location of points of a given flat layer (section) of said three-dimensional part.

The following terms are used in the context of this application.

A holographic interference pattern of the part is a flat image on a plate or holographic matrix designed to restore a three-dimensional image of said part when irradiated with reference microwave radiation, which is a set of interference ("dark" and "light") bands.

A holographic three-dimensional image of the part is a three-dimensional image (hologram), the equivalent of said part that represents variations of intensity and phase of microwave radiation in the operating chamber.

The term holography in this context is understood as a method of restoring a three-dimensional image using radiation from its interference pattern, regardless of the type of radiation used, in a particular case, using microwave radiation.

The term transit medium refers to a gas, liquid, other powder, gel or something else (filler), in which the powder is placed and from which the part is manufactured.

Powder means the working material from which the part is formed.

The term resolution means a concept similar to optical resolution, i. e. the minimum possible size of individual heating zones in the volume or in the plane.

Same as terahertz radiation, microwave radiation is electromagnetic radiation, i. e. a set of waves, which vibrations result in the intensity of the electric and magnetic fields. Electromagnetic waves carry the electromagnetic field energy, which flow is determined by the Poynting's vector.

At that, the intensity of electromagnetic radiation is equal to the average value of the Poynting's vector modulus over the period. Thus, in the case under consideration, the intensity is a scalar physical value that quantitatively characterizes the power carried by the wave towards propagation. In the numerical terms the intensity is equal to the averaged value over the period of radiation power wave vibrations passing through a single area perpendicular to the wave propagation direction and is measured in the SI system units of W/m2.

The proposed method is used to organize the bulk absorption of microwave energy inside the powder mass in the zones with increased intensity of microwave radiation, where an independent source of radiation heating is organized and located in the powder mass without convective transfer to the neighboring zones.

Such zones are characterized by microwave heating caused by the bulk absorption of microwave energy by most materials of either the powder itself or the medium in which the powder is placed. Microwave heating has two principal features. The proposed result is achieved due to the fact that, on the one hand, when absorbing microwave energy in the entire volume of the product, there is no need for heat transfer by thermal conductivity, and, on the other hand, the microwave radiation heating rate can be significantly increased.

The proposed method is implemented as follows.

A powder with a maximum particle size of 1 mm is placed in the operating chamber. The powder can be in a transit medium of any gas or liquid. The powder can also be placed in a solid transit medium. For example, it can be combined with another powder, enclosed in a solid body, or simply fill the entire operating chamber with only the powder from which the product is made. The main thing is to have at least one of the components of polar molecules that ensure microwave radiation absorption and heat release. The best result is achieved if the powder is placed evenly in the transit medium. A microwave field is created in the operating chamber using a source, for example, a maser, a magnetron or a klystron, etc., with the microwave radiation power of 100 W to 150 MW and the frequency of 1 GHz to 10 THz. The power of the required microwave radiation depends on the physical properties of the powder, for example, its refractory quality, as well as on the size of the manufactured part. Since the wave length is known to determine the resolution, and the wave length of microwave radiation depends on the frequency, the lower the frequency is, the larger the size of the minimum possible element of the part is, and accordingly the lower the accuracy is. For the manufacture of more complex and precise parts, a shorter wave length is required, which is achieved by a higher frequency. The microwave radiation is also required to "focus" at those points (zones), where the sintered/melted powder particles will correspond to the geometric shapes of the produced part. Therefore, it is necessary to control the zones with increased intensity of microwave radiation by increasing the intensity of the microwave field in these zones, which will lead to increased heat generation in said zones. The intensity of microwave radiation in the desired zones is increased by using the effects of wave optics-interference and diffraction of electromagnetic waves, where two or more wave propagation vectors are added in the same direction and to the extent that these directions coincide. The picture of zones with increased intensity of microwave radiation in the operating chamber with powder and transit medium shall correspond to the geometry of the part. Then, there will be zones of increased intensity of microwave radiation within the mass of powder particles, which will include zones of increased heat release, due to the bulk absorption of microwave energy that will heat the powder to a temperature sufficient for sintering or melting of the nearest powder particles without heat convection to the neighboring powder zones. At the same time, the heating temperature in the adjacent powder zones will be insufficient to sinter/melt the powder, i. e. there will be no sticking of particles in these zones. If the powder material has insufficient energy intensity, the heating zone is formed due to the energy intensity of the transit medium in this zone. Thus, affecting the geometric characteristics (phase, amplitude, direction of polarization, rotation and other wave characteristics) of the microwave radiation field at these points, the temperature will increase only at the desired point, while the radiation intensity around it will be insufficient for sintering/melting.

The most accurate and complex parts can be manufactured by providing a resolution of less than a millimeter. In other words, electromagnetic radiation in the terahertz range is to be used for such parts.

The necessary geometry of the heating zones can be created using an interference matrix similarly to the hologram technologies (holographic images).

Since the laws of wave propagation and interaction are the same for all wave types and lengths of any range (both for the visible frequency range, for radio frequencies, for X-ray frequencies, and for microwave frequencies), since they are all electro-magnetic waves, the holographic image constructing principles are applicable to both laser radiation and microwave radiation.

BRIEF DESCRIPTION OF DRAWINGS

The method is illustrated by drawings that do not cover all possible options of the method implementation.

FIG. 2a shows a device with a physical resonator on a carriage;

FIG. 2b shows a device with a virtual resonator on a carriage;

FIG. 2c shows a device with a virtual resonator with a deflecting optical system;

Below are examples of two implementation options, but they do not cover all possible implementation examples of this method.

Figure 1:
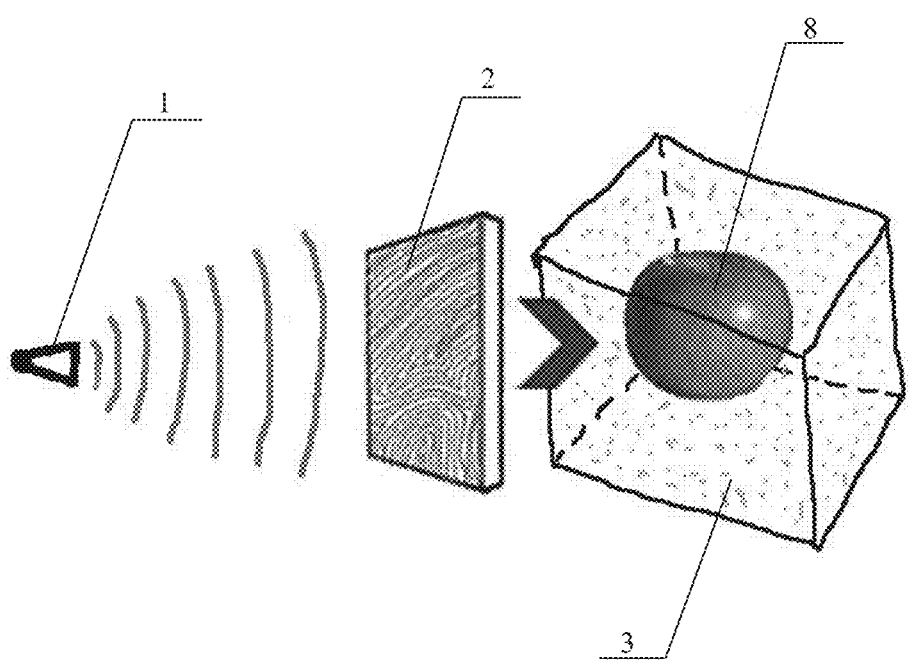
FIG. 1 shows a sintering/melting apparatus, which can be applied to implement the proposed method using a holographic three-dimensional image of the part.

Example 1. FIG. 1 shows a sintering/melting apparatus, which can be applied to implement the proposed method using a holographic three-dimensional image of the part.

INDUSTRIAL APPLICABILITY

The work is carried out as follows.

A chamber similar to a standard microwave oven for industrial or consumer heating is taken as an operating chamber (conventionally not shown), which uses microwave radiation depending on the scope of sintering, its physical properties and the complexity and accuracy of the manufactured part geometry. It has a source of (1) the required power of the microwave radiation and frequency inside that creates a microwave field of the pre-set intensity in the operating chamber, for example, a wave guide, a maser, a magnetron, a klystron, etc. Microwave radiation passes through the interference matrix (2) (containing a holographic interference image of the part), which is used to create a three-dimensional holographic image of the part in the operating chamber section with the transit medium with powder (3).

At that, no mechanical part, such as a 3D printer is required since the operating chamber does not need to be moved. By generating (3) a holographic three-dimensional image of the part in the form of zones with increased intensity of microwave radiation in the operating chamber (not only in the transit medium, but also in the powder) with the use of an interference pattern, the heating zones are established, where the powder is sintered/melted at the required points. The part is manufactured by creating a part from powder simultaneously in all heating zones of the powder, "manifesting" it in the powder mass. Then it is only required to release the produced part from the remains of the transit medium and excess powder.

Figure 2A:
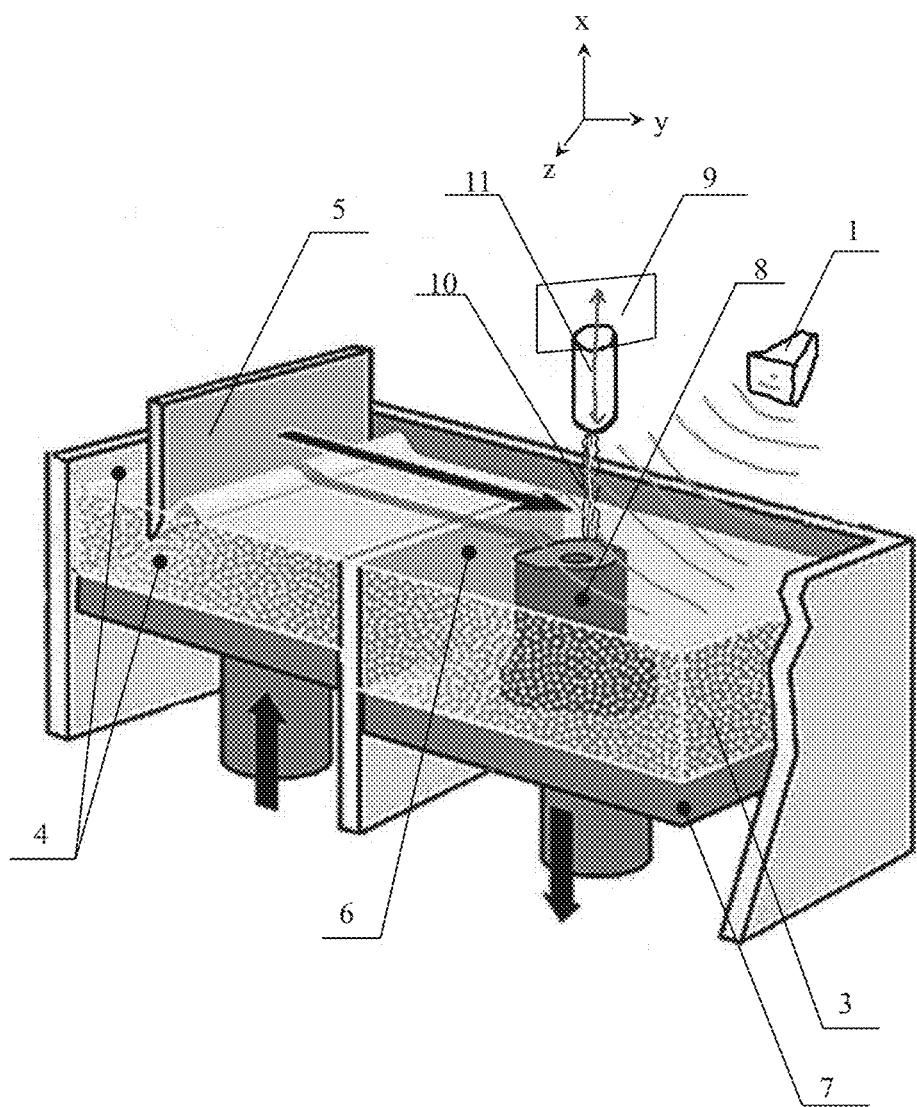
FIGS. 2a, 2b, and 2c show sintering/melting devices, which can be used to implement the proposed method by causing a microwave breakdown in the determined zone using a resonator.
Figure 2B:
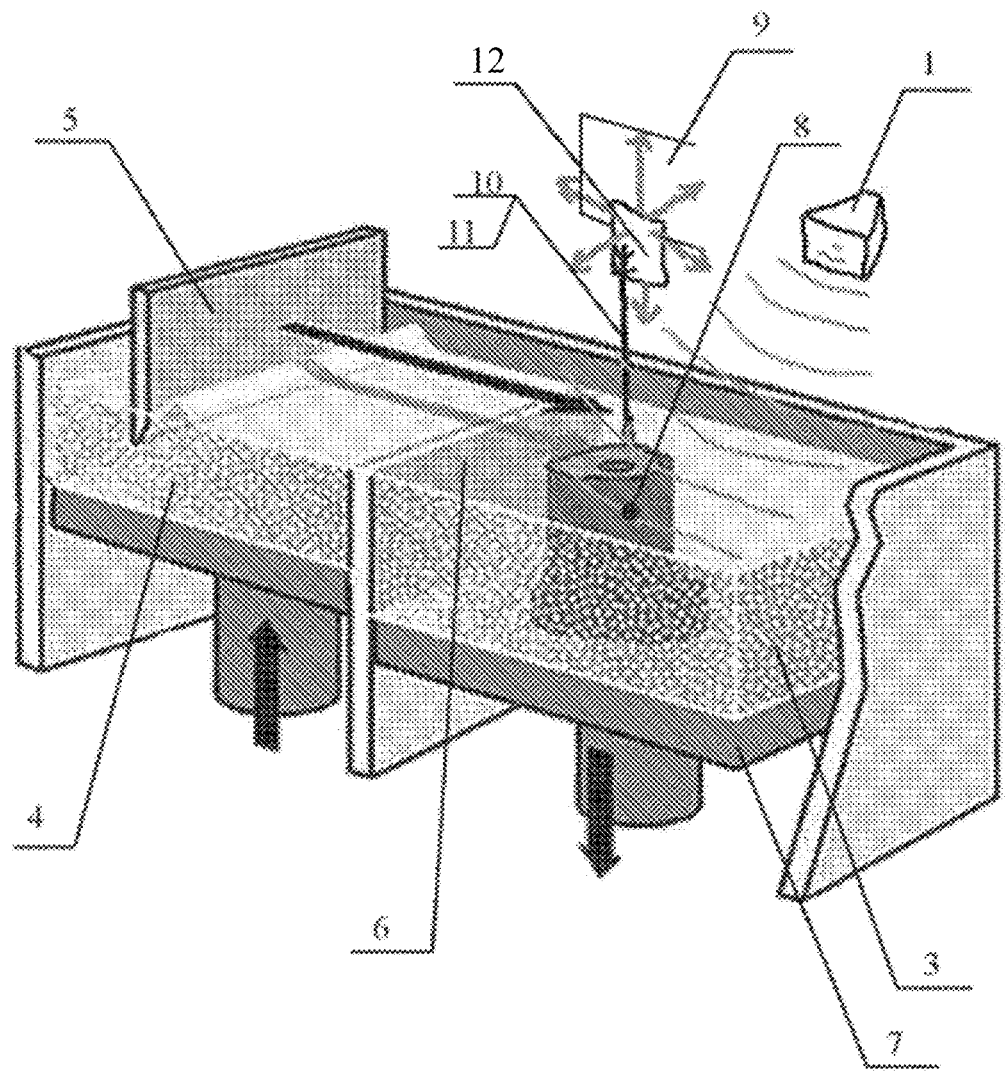
Figure 2C:
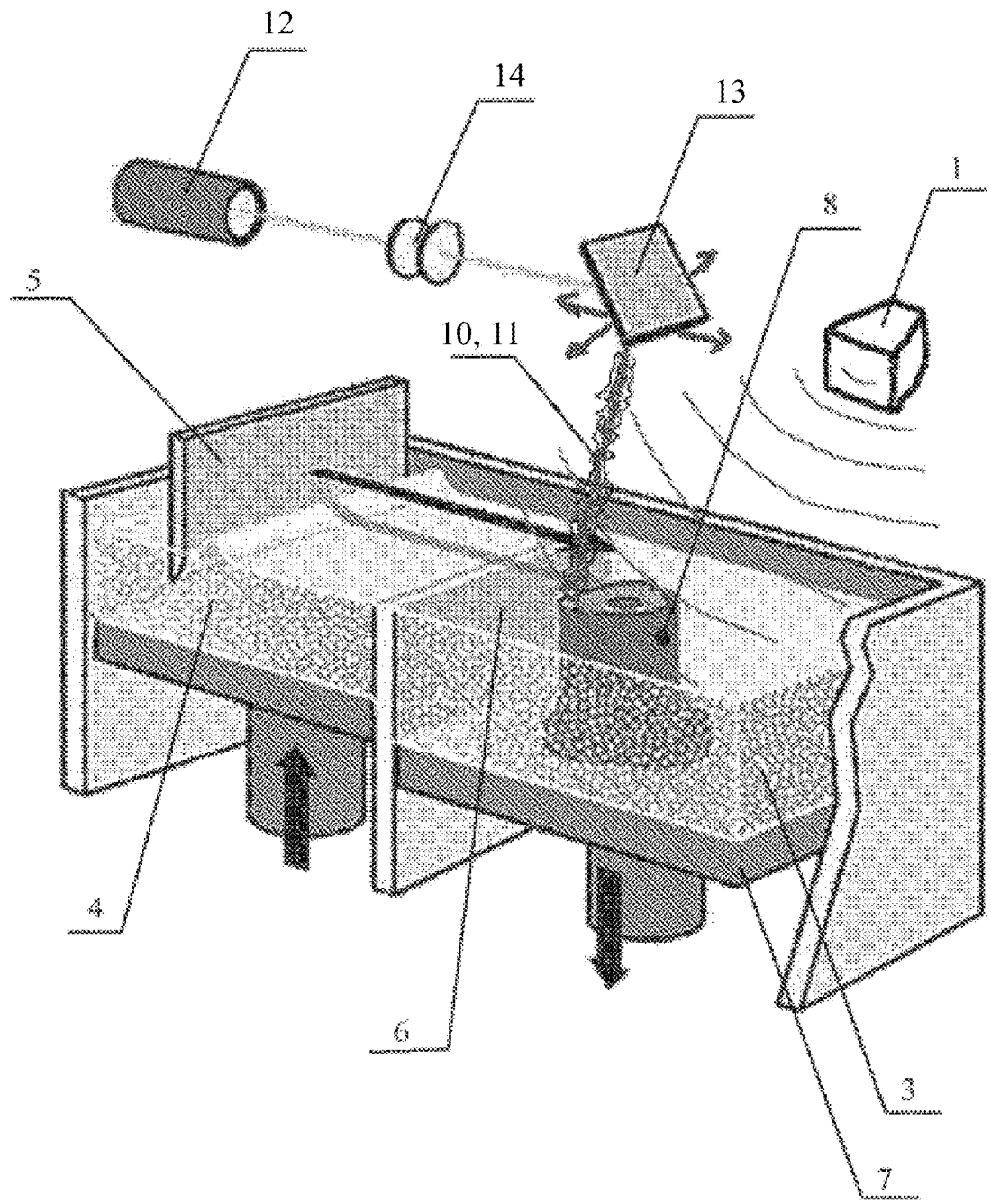

Example 2. FIG. 2a, 2b, and 2c show sintering/melting devices, which can be used to implement the proposed method by causing a microwave breakdown in the determined zone using a resonator.

The work is carried out as follows.

At least one instance of the following components is placed in the operating chamber (filled with gas or liquid) (conventionally not shown): a hopper feeder (4), which is a powder source for the part synthesis, a (5) powder filling-laying carriage for the powder supply and laying (3) into the operating hopper (6), an operating hopper (6) with a mobile platform (7), which can move the powder and the product (8) in the vertical direction, as well as a carriage for resonator connection (9) (see FIG. 2a, b) to the powder surface and the microwave radiation source (a wave guide, an antenna, a magnetron, etc.) (1). Produced part (8). Microwave breakdown zone (10). Resonator (11).

Having received a portion of powder from the hopper feeder (4) the filling-laying carriage (5) lays it out in a determined layer on a mobile platform (7) in the operating hopper (6).

The operating chamber shall be filled with a microwave field (continuously or in pulse mode). The perfect configuration of the microwave field is when a uniform microwave field is created over the entire surface of the top powder layer in the operating chamber, or when a microwave field is created in the operating chamber above the top powder layer (3) only in the area of the resonator (11) and breakdown (10).

FIG. 2a shows a rod as a resonator (11), which is fixed to the mobile resonator supply carriage (9), the fastening is shown conventionally, the breakdown zone (10) in the case of a solid resonator is small and takes place between the end of the resonator (11) (see FIG. 2a) and the part (8).

An item of a special shape can be used as a resonator (11), which geometric characteristics are calculated and depend on the wave length of the used electromagnetic (microwave) radiation (usually a rod or a split ring, etc.), fixed on a carriage (9) providing for independent movement of the resonator along three axes in order to bring it to the surface of the laid powder layer in any place with the determined accuracy and to remove it from said surface (see FIG. 2a).

FIG. 2b, c show cases when a virtual resonator (11) can be used as a resonator, which is a controlled ionized channel (ionic trace), brought by ionizing radiation to the transit medium filling the operating chamber (6). The ionizing beam emitter (12) can be a UV light source or a laser (see FIG. 2b, c). In this case, the breakdown (10) occurs along the entire length of the ionizing beam exposed to the microwave field.

FIG. 2b shows the case when the ionizing beam emitter (12) is fastened on the resonator supply carriage (9) (which is shown conventionally), i. e., for example, a round laser is fixed on its mobile carriage (9), which movement is used to control the ionizing beam.

FIG. 2c shows the case where the ionizing beam can be controlled by deflecting it with a swinging mirror (13), and focused, for example, with the use of optical lenses (14).

Hereinafter all types of resonators are designated simply as a resonator (11).

As a result of supplying the resonator (11) to the required zone near the powder surface, the microwave field intensity in said zone at the end of the resonator (between the resonator (11) and the powder (3)) increases sharply, which leads to the appearance and development of a microwave breakdown of the transit medium, accompanied by the release of a large amount of heat providing for sintering/ melting of the powder particles (3) in the transit medium in said zone. By placing the resonator (11) in the required places, the geometric location of the points of the powder sintering/melting zones is established. The aggregate of these points represents a flat section of the manufactured part in a specific layer.

After the sintering/melting process of the part layer is over, the platform (7) with the powder and the part in the operating hopper (6) is lowered, and the filling-laying carriage (5) applies a new powder layer from the hopper feeder (4), and then the process is repeated.

Movement of the resonator (11) with a microwave breakdown of the proposed process is similar to the movement of the electrode with an arc in electric arc welding. However, unlike the welding electrode, the resonator in the proposed method is not the main source of charged particles emission and is not exposed to increased wear, and the melted material is not transferred through an electric arc and is not sprayed out, which has a positive effect on the quality and strength of the resulting products.

An additional positive factor is the occurrence in the microwave breakdown zone (which is a kind of electric discharge) of the pinch effect based on the mutual attraction of parallel electric currents by Ampere forces, which, in its turn, provides additional mutual compression (compaction) of the powder particles in a plane perpendicular to the of current direction, resulting in a significant increase in the density and strength of the sintered/melted part in comparison with SLS/SLM/EBM methods.

The process will not be accompanied by heat convection either, since the powder will not be heated to the sintering/melting temperature in the neighboring zones, therefore, no "coat" will be formed.

The ability to control the microwave radiation power and the gap between the resonator and the powder surface enables to dynamically influence the dimensions of the microwave breakdown zone and, accordingly, the dimensions of the powder sintering/melting zone, which makes it possible to manufacture large and small elements of the part with a spot of various diameters without realigning the equipment. This provides for a multi-fold increase in the process productivity in comparison with the processes using a laser or an electron beam. This reason is that in contrast to the proposed method, the laser spot during focusing cannot be dynamically changed within a wide range.

The price of microwave radiation sources is at least two orders less than the price of lasers of the respective power, providing for the mass production of low-budget class devices (the power contour of the device is in general similar to household microwave ovens, while its mechanical part is similar to a standard FDM 3D printer), which will also contribute to the absence of harmful stray radiation.

The invention claimed is:

1. A method of manufacturing a part from a powder, the method comprising:
   placing the powder with a particle size of maximum 1 mm in an air, gas, liquid or solid transit medium in an operating chamber;
   creating a microwave field within the operating chamber with a microwave radiation power of 100 W to 150 MW and a frequency of 1 GHz to 10 THz, depending on physical properties of the powder, dimensions, degree of accuracy and complexity of geometric shapes of the part to be manufactured; and
   developing, in the created microwave field, zones with an increased intensity of microwave radiation to develop heating zones of the powder corresponding to the zones with the increased intensity of microwave radiation, wherein the zones with the increased intensity of microwave radiation have shapes that follow a point, or a flat section or a spatial pattern of the part to be manufactured, wherein the increased intensity of microwave radiation results in a release of thermal energy sufficient to heat the powder to a sintering temperature of the powder in the heating zones, taking into account an initial temperature of the powder, and thereby sinter or melt the powder in the heating zones to produce the part;
   wherein:
   the thermal energy sufficient to heat the powder to the sintering temperature in the heating zones is released as a result of microwave radiation absorption in the zones of the increased intensity of microwave radiation; and
   locations of the zones of the increased intensity of microwave radiation correspond to a volumetric holographic image of the part to be manufactured and are determined by an interference matrix comprising an irradiated microwave radiation plate with a programmed holographic interference image of the part to be manufactured and placed in the operating chamber relative to a microwave radiation source so that microwave radiation passes through the interference matrix.

2. A method of manufacturing a part from a powder, the method comprising:
   placing the powder with a particle size of maximum 1 mm in an air, gas, liquid or solid transit medium in an operating chamber;
   creating a microwave field within the operating chamber with a microwave radiation power of 100 W to 150 MW and a frequency of 1 GHz to 10 THz, depending on physical properties of the powder, dimensions, degree of accuracy and complexity of geometric shapes of the part to be manufactured; and
   developing, in the created microwave field, zones with an increased intensity of microwave radiation to develop heating zones of the powder corresponding to the zones with the increased intensity of microwave radiation, wherein the zones with the increased intensity of microwave radiation have shapes that follow a point, or a flat section or a spatial pattern of the part to be manufactured, wherein the increased intensity of microwave radiation results in a release of thermal energy sufficient to heat the powder to a sintering temperature of the powder in the heating zones, taking into account an initial temperature of the powder, and thereby sinter or melt the powder in the heating zones to produce the part;
   wherein:
   the thermal energy is generated by causing a microwave breakdown in determined areas being the heating zones, which occurs when an intensity of the microwave field in the heating zones exceeds a critical value due to at least one resonator focusing, on the determined areas, ionizing light or laser flux by a lens or a solid resonator, with the at least one resonator being moved in space over a respective layer of the powder to create the heating zones where the powder is sintered or melted in points corresponding to a geometric location of points of a determined two-dimensional layer of the part to be manufactured.

* * * * *